United States Patent
Caliskan et al.

(10) Patent No.: US 8,292,357 B2
(45) Date of Patent: Oct. 23, 2012

(54) REINFORCED CLOSED SECTION ASSEMBLY

(75) Inventors: Ari Garo Caliskan, Canton, MI (US); Michael M. Azzouz, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 124 days.

(21) Appl. No.: 12/630,462

(22) Filed: Dec. 3, 2009

(65) Prior Publication Data

US 2011/0133519 A1  Jun. 9, 2011

(51) Int. Cl.
*B60J 7/00* (2006.01)

(52) U.S. Cl. .......................................... 296/204

(58) Field of Classification Search .................. 296/204, 296/146.6, 146.9, 205; 100/902
See application file for complete search history.

(56) References Cited

U.S. PATENT DOCUMENTS

| | | | | |
|---|---|---|---|---|
| 3,025,596 | A | * | 3/1962 | Ward et al. ...................... 228/131 |
| 3,123,170 | A | * | 3/1964 | Bryant .......................... 180/68.4 |
| 4,686,807 | A | * | 8/1987 | Newsome ....................... 52/314 |
| 4,864,711 | A | * | 9/1989 | Yokota ............................ 29/458 |
| 5,394,680 | A | * | 3/1995 | Sheldon et al. ................... 56/41 |
| 5,478,019 | A | * | 12/1995 | Morikawa et al. ....... 241/101.73 |
| 5,766,719 | A | * | 6/1998 | Rimkus ........................... 428/71 |
| 6,082,811 | A | * | 7/2000 | Yoshida ..................... 296/146.6 |
| 6,122,948 | A | * | 9/2000 | Moses ............................... 72/61 |
| 6,189,953 | B1 | * | 2/2001 | Wycech .................... 296/187.02 |
| 6,237,304 | B1 | * | 5/2001 | Wycech ......................... 296/205 |
| 6,272,809 | B1 | * | 8/2001 | Wycech ......................... 296/205 |
| 6,299,258 | B1 | * | 10/2001 | Wright et al. ............... 301/124.1 |
| 6,406,078 | B1 | * | 6/2002 | Wycech ......................... 293/120 |
| 6,505,389 | B2 | | 1/2003 | Manson et al. |
| 6,575,526 | B2 | | 6/2003 | Czaplicki et al. |
| 7,194,804 | B2 | | 3/2007 | Czaplicki |
| 7,533,543 | B2 | * | 5/2009 | Renaudin et al. ............... 65/495 |
| 2002/0125739 | A1 | * | 9/2002 | Czaplicki et al. ............. 296/187 |
| 2004/0256428 | A1 | * | 12/2004 | Meggiolan ..................... 224/414 |
| 2005/0241434 | A1 | * | 11/2005 | Persson et al. .................. 74/559 |

OTHER PUBLICATIONS

Liang Huang and Min Kuo, Mittal Steel USA, Inc., Flexible Joint Design for Tube Structure, SAE Technical Paper Series 2007-01-0456, Apr. 16-19, 2007.
Gary Morphy, Vari-Form Inc., Hydroforming and Expanding High Strength Tube for Automotive Structural Applications, IBEC'97, Body and Assembly & Manufacturing.

* cited by examiner

*Primary Examiner* — Kiran B Patel

(74) *Attorney, Agent, or Firm* — Gigette M. Bejin; Fredrick Owens

(57) ABSTRACT

A reinforced closed section assembly is provided wherein the assembly includes a closed section member defining a first hole on a first side and a second hole on a second side opposite the first side. The reinforced closed section assembly further includes a reinforcement member disposed within the first and second holes of the closed section member.

9 Claims, 4 Drawing Sheets

REINFORCED CLOSED SECTION ASSEMBLY

BACKGROUND

The present disclosure relates generally to vehicle structures, and more particularly to a reinforcement for a vehicle structure.

In current vehicle structures, it has become challenging to obtain space within the vehicle to implement components that absorb impact energy created during a vehicle crash. Conventional designs for absorbing high-energy impacts, such as that described in U.S. Pat. No. 3,931,997 to Myers, typically include structures that are made from high strength materials like various high strength steels. These tubular structures may be designed as vehicle rails, or may be separately positioned in fore/aft direction of the vehicle to absorb the energy of a fore/aft collision. However, such designs have a tendency to buckle laterally if the load is offset, that is, if the load is not concentric with the tube. Moreover, because of the limited space available in the vehicle and because of the limited frame selection allowed, improving the axial strength of such structures tends to increase the degree of lateral instability of the tubes.

Other conventional designs include crush cans or crush tubes that are welded or mechanically fastened to one end of a rail and a vehicle bumper such as that shown in U.S. Pat. No. 5,876,078 issued to Miskech. The crush cans or crush tubes that are implemented in Miskech, as indicated above, has a tendency to buckle laterally if the load is not concentric with the tube.

As shown in FIGS. 1 and 2 together, a prior art crush tube assembly 110 of the '593 patent is illustrated. The crush tube assembly 110 includes a tube 118 which is disposed within a two piece stamped body structure 116 but does not additional length to the underlying structure. The tube 118 is welded into one of stamped members and then the mating stamped member is subsequently installed to create a closed section. The crush tube assembly 110 of the prior art design requires a two-pieced stamped body structure 116 which is generally greater in weight and cost. Furthermore, such a design results in increased assembly or manufacturing time.

As indicated, other systems may be used to absorb impact energy by including an entire redesign of an automotive vehicle body structure, such as for example the vehicle body structure described in U.S. Pat. No. 6,312,038 to Kawamura, et. al. Such designs may include extensions of the vehicle body frame in the fore/aft direction in order to accommodate one or more energy absorbing members.

Such redesigns, however, are more expensive to develop and are not compatible with automobiles in present production regardless of the area of the vehicle where increased energy absorption is desired. In particular, presently produced automobiles may not have the necessary packaging space available for housing an increased number of absorbing members, or tubes.

SUMMARY

A reinforced closed section assembly is provided according to the embodiment(s) disclosed herein. The reinforced closed section assembly includes a closed section member defining a first hole on a first side and a second hole on a second side opposite the first side. The reinforced closed section assembly further includes a reinforcement member disposed within the first and second holes of the closed section member.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure provides an effective structure and method of incorporating an anti-crush tube for a closed section structure.

Figure 1:
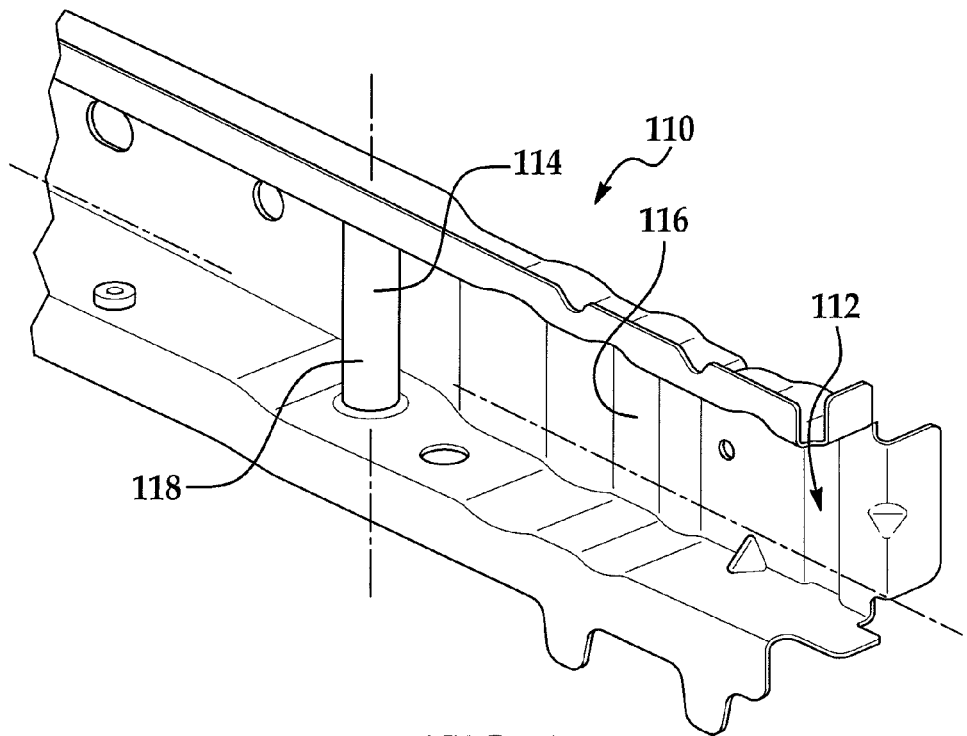
FIG. 1 is a partial, perspective view of a prior art, open body structure having a reinforcement member.
Figure 2:
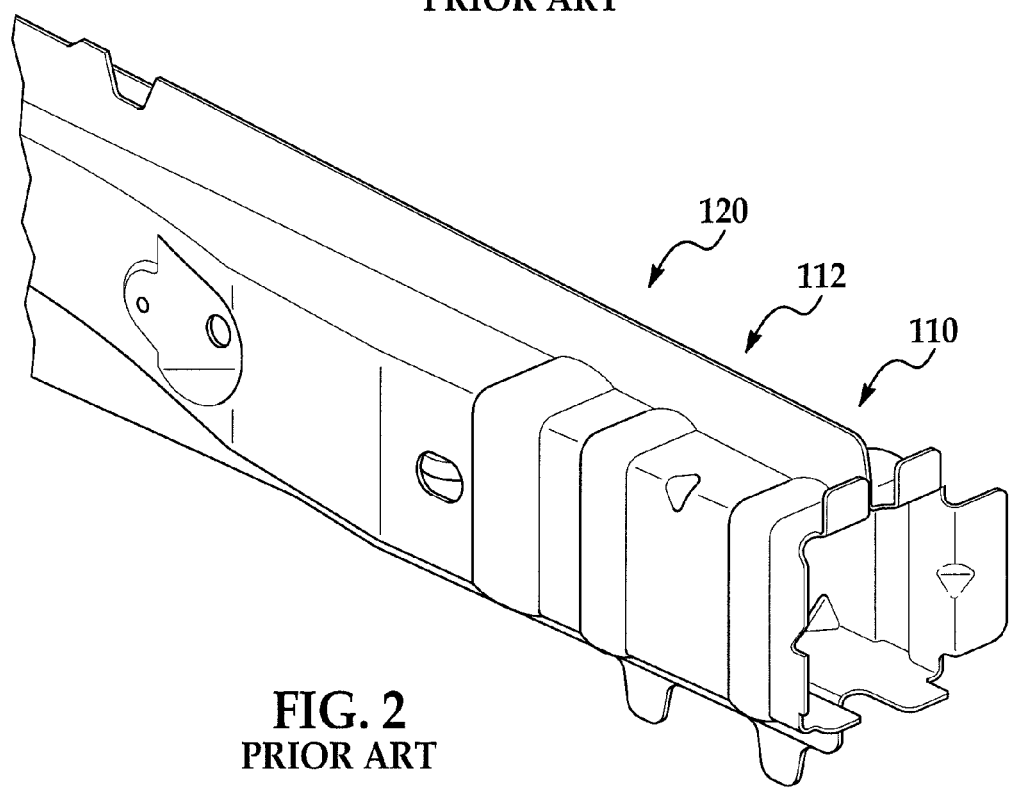
FIG. 2 is a partial, perspective view of a prior art, closed body structure having a reinforcement member.
Figure 3:
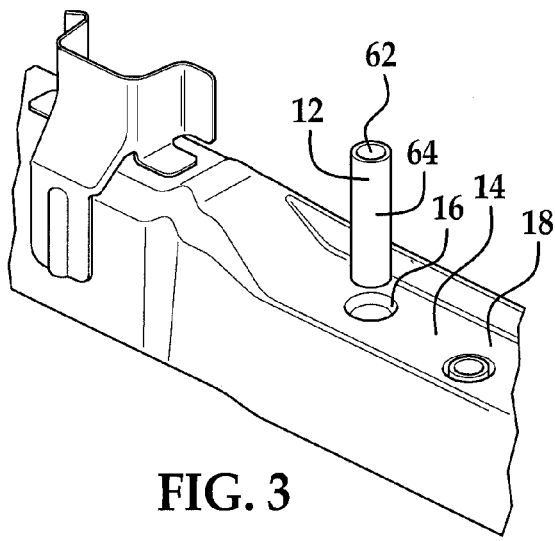
FIG. 3 is a partial, perspective view of a closed section member with holes and the corresponding anti-crush tube.
Figure 5:
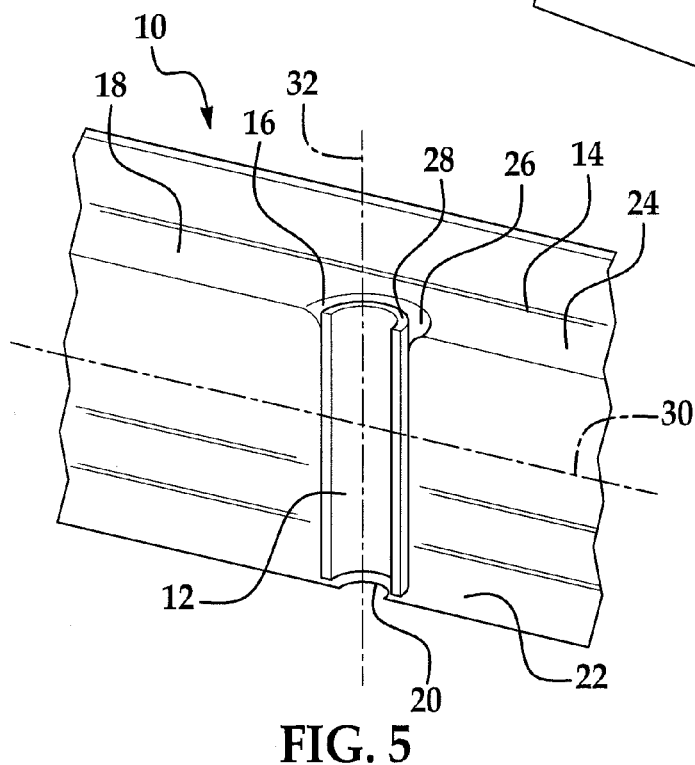
FIG. 5 is an enlarged, partial, cross sectional view of a closed section member with the anti-crush tube installed within the holes of the closed section member.

Referring now to FIG. 3, an embodiment of the reinforced closed section assembly 10 is shown. It is to be understood that the closed section member 14 may be manufactured through a variety of means, such as, but not limited to hydroforming or extruding. The reinforced closed section assembly 10 includes a closed section member 14 defining a first hole or opening 16 on a first side 18 and a second hole or opening 20 on a second side 22 opposite the first side 18. As shown in FIGS. 3 and 5, the holes or openings 16, 20 created in the closed section member 14 may be formed such that the outer surface 24 of the closed section member 14 is sloped inward. This configuration allows for a smooth exterior surface 24 and further facilitates the installation of a reinforcement member 12. The sloped exterior portion 26 may guide the reinforcement member 12 into position.

The reinforcement member 12 may have an inner surface 62 and an outer surface 62. The reinforcement member 12 may be disposed within the first and second holes 16, 20 of the closed section member 14 such that the reinforcement member 12 is inserted through one of the first or second holes 16, 20 of the closed section (vehicle body structure) member 14.

As shown in FIG. 3, the reinforcement member 12 may span the height or the width of the closed section (vehicle body structure) member 14. The non-limiting example of FIG. 3 illustrates the reinforcement member 12 as a tube 12' wherein the tube 12' has a circular cross section. However, it is to be understood that the reinforcement member 12 may also vary in configuration such that it has a square like configuration or other shaped configuration (oval, etc.). Although the reinforcement member 12 in FIG. 3 is a closed section (circular tube), the reinforcement member 12 may have an open-section such as one or more brackets (not shown) that may span from the first opening 16 to the second opening 20.

Figure 4:
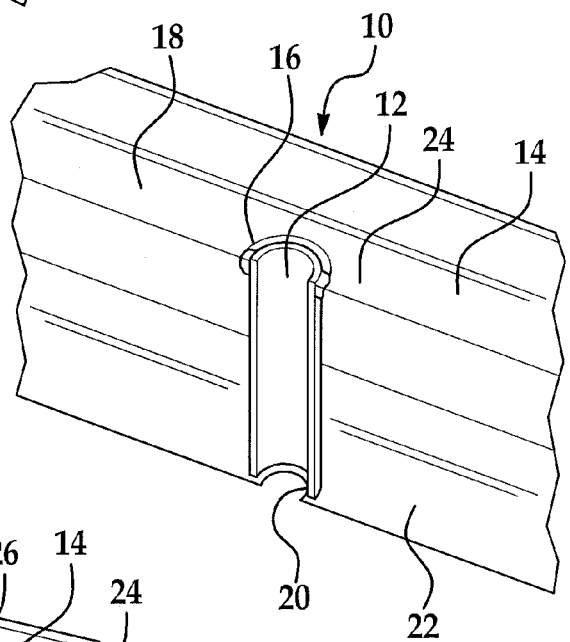
FIG. 4 is a partial, cross sectional view of a closed section member with the anti-crush tube installed within the holes of the closed section member of FIG. 1.

Referring now to FIG. 5, the reinforcement member 12 may have a portion 28 of the reinforcement member 12 which extends beyond an outer surface 24 of the closed section (vehicle body structure) member 14 to allow for a sufficient structural foundation to weld the reinforcement member 12 to the closed section (vehicle body structure) member 14. Alternatively, the reinforcement member 12 may extend up to the outer surface 24 of the closed section member 14 on each of the first side 18 and the second side 22 as shown in FIG. 4.

In one non-limiting example, the reinforcement member 12 may be affixed to the closed section member 14 at the first opening 16 and second opening 18 via a projection welding process or other welding process (spot welding, etc.). The reinforcement member 12 may be affixed to the closed section (vehicle body structure) member 14 using mechanical fasteners (60 in FIG. 6) or adhesives. There may be additional reinforcement components affixed (not shown) at the first opening 16 and/or the second opening 20 to properly secure the reinforcement member 12 to the closed section (vehicle body structure) member 14.

Figure 6:
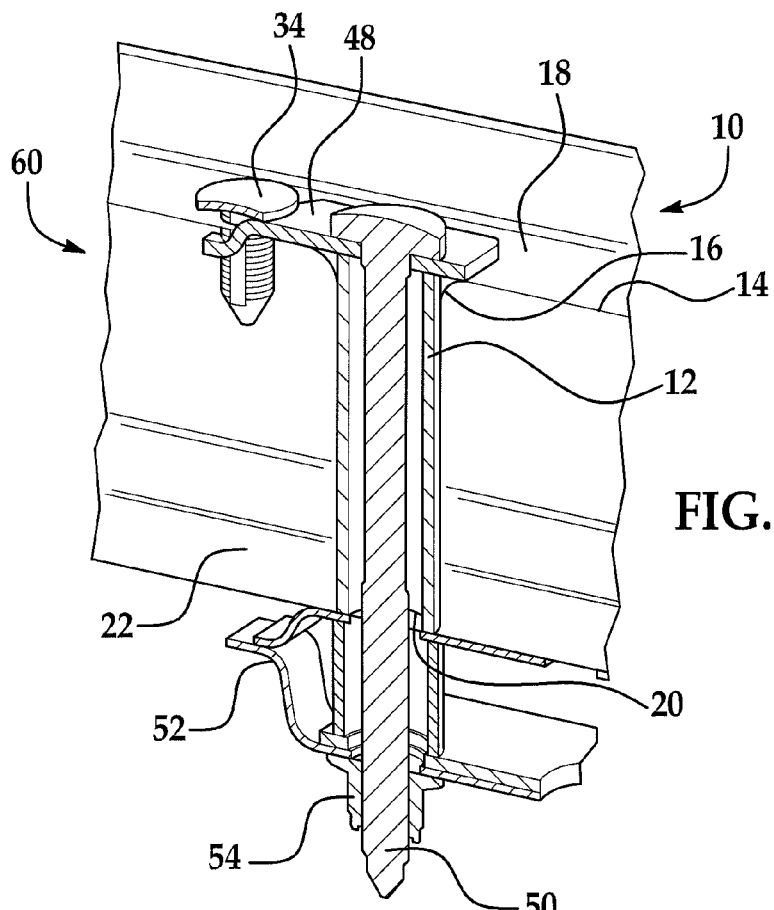
FIG. 6 is an enlarged, partial, cross sectional view of a closed section member with a nut and bolt and the anti-crush tube installed within the holes of the closed section member.

Referring now to FIG. 6, an example of a mechanical fastener 60 is shown. A threaded screw 34 may be used with a washer or reinforcement 48. A bolt 50 may then be inserted through the reinforcement member 12, the first opening 16 and the second opening 20. An additional reinforcement 52 may be implemented at the second opening with a nut 54 used to secure the bolt 50 and the reinforcements 48, 52 in position. Regardless of whether additional mechanical reinforcement components are implemented, the reinforcement member 12 may be operatively configured so that the reinforcement member 12 engages with the first opening 16 (or hole) and the second opening 20 (or hole) of the closed section (vehicle body structure) member 14.

Referring again to FIGS. 3-7, the closed section (vehicle body structure) member 14 may be one of many body structures such as a chassis rail 14', a roof rail (not shown), a B-Pillar (not shown), a header (not shown), etc. The closed section (vehicle body structure) member 14 and the reinforcement member may be made of the same material, such as but not limited to aluminum. As shown in FIG. 5, the longitudinal axis 32 of the reinforcement member 12 may be substantially perpendicular to a longitudinal axis 30 of the closed section (vehicle body structure) member 14. It is to be understood that this configuration allows the overall reinforced closed section assembly 10 to better absorb energy in the event of a crash or a collision.

Figure 7:
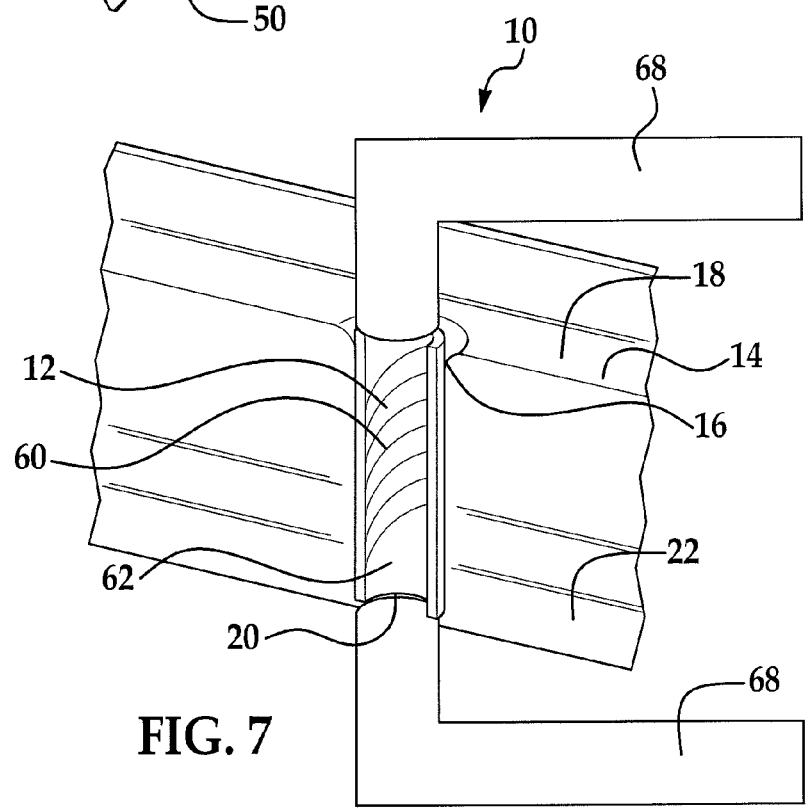
FIG. 7 is enlarged, partial, cross sectional view of a closed section member with the anti-crush tube installed within the holes of the closed section member using a projection welding method.

With reference to FIG. 7, the reinforcement member 12 may be projection welded (using a projection welder 68) into closed section member 14. It is also to be understood that the reinforcement member 12 may be TIG/MIG welded or spot welded into position. With respect to projection welding and FIG. 7, the reinforcement member 12 may be projection welded at the first opening 16 and the second opening 20 as shown in FIG. 7. Furthermore, in this example embodiment, the reinforcement member 12 may be threaded 60 on the inner surface 62 of the reinforcement member 12 thereby allowing a bolt (not shown) to be threaded directly into the reinforced closed section assembly 10. Accordingly, the bolt (not shown in FIG. 7) may be anchored to the reinforced closed section assembly via the threaded surface and may not be required to go entirely through the reinforcement member 12 for joining with a nut (not shown).

Figure 8:
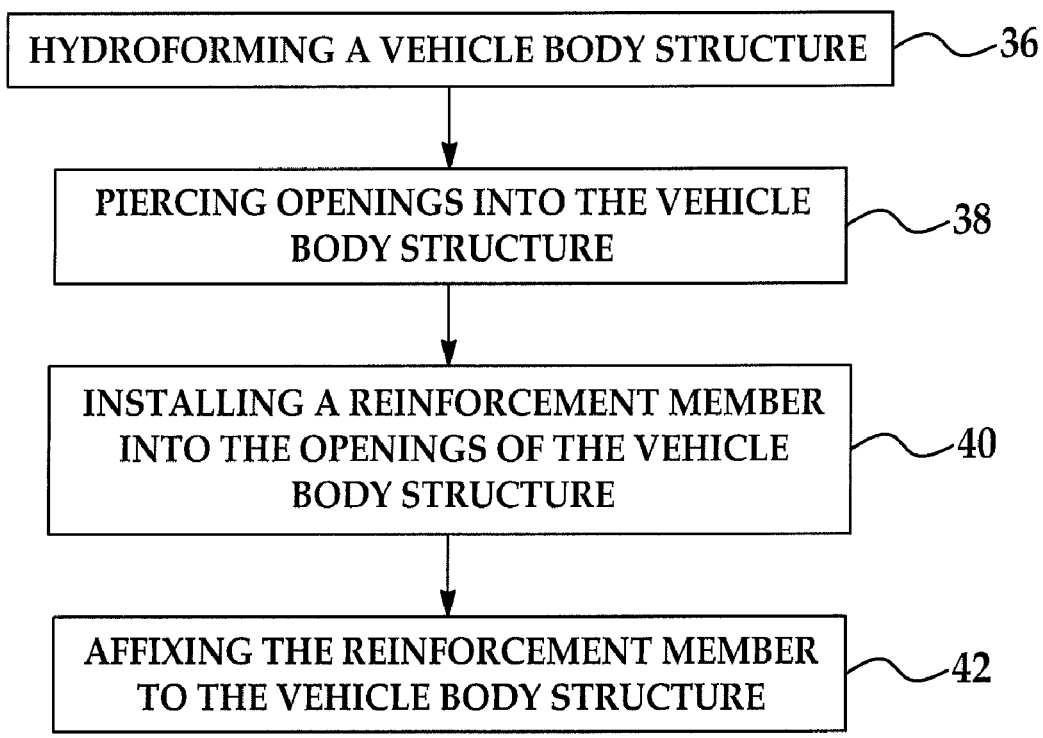
FIG. 8 is a flow chart which illustrates an embodiment of a method of manufacturing a reinforced closed section assembly.

Referring now to FIG. 8 of the present disclosure, a flow chart is shown which illustrates a method for manufacturing a reinforced closed section assembly 10. The method includes the first step of hydroforming a vehicle body structure (step 36). The second step includes piercing, extruding (or the like) openings 16, 20 into the vehicle body structure (step 38). It is to be understood that the piercing of the openings 16, 20 may occur during or after the hydroforming process. Furthermore, as noted, the openings or holes may be extruded. The third step includes installing a reinforcement member into the openings (first opening and second opening) of the vehicle body structure (step 40). This third step of installing the reinforcement member 12 into the closed section vehicle body structure 14 may also include engaging the reinforcement member 12 to the closed section vehicle body structure 14. The fourth step includes affixing the reinforcement member 12 into the vehicle body structure (step 42).

The step of affixing the reinforcement member 12 to the closed section member 14 may further include projection welding the reinforcement member 12 to the closed section (vehicle body structure) member 14. In yet another embodiment, the step of affixing the reinforcement member 12 to the closed section (vehicle body structure) member 14 may include implementing mechanical fasteners to affix the reinforcement member 12 to the closed section (vehicle body structure) member 14.

While multiple embodiments have been described in detail, it will be apparent to those skilled in the art that the disclosed embodiments may be modified. Therefore, the foregoing description is to be considered exemplary rather than limiting.

What is claimed is:

1. A reinforced closed section assembly comprising:
   a closed section hydroformed member defining a first hole on a first side and a second hole on a second side opposite the first side, the closed section hydroformed member having a first sloped exterior portion on a first hole periphery and a second sloped exterior portion on a second hole periphery; and
   a reinforcement member disposed within the first hole and the second hole of the closed section member.

2. The reinforced closed section assembly as defined in claim 1 wherein the reinforcement member is affixed to the closed section member via a projection welding process.

3. The reinforced closed section assembly as defined in claim 1 wherein the reinforcement member is a hollow tube.

4. The reinforced closed section assembly as defined in claim 1 wherein the closed section member is a chassis rail.

5. The reinforced closed section assembly as defined in claim 1 wherein the closed section member and the reinforcement member are made of aluminum.

6. The reinforced closed section assembly as defined in claim 1 wherein a longitudinal axis of the reinforcement member is substantially perpendicular to a longitudinal axis of the closed section member.

7. The reinforced closed section assembly as defined in claim 1 wherein a portion of the reinforcement member extends beyond an outer surface of the closed section member.

8. The reinforced closed section assembly as defined in claim 1 wherein the reinforced member is affixed to the closed section member via a one of a MIG welding process, a TIG welding process, or a spot welding process.

9. The reinforced closed section assembly as defined in claim 3 wherein the hollow tube defines a threaded surface on the interior of the hollow tube.

* * * * *